(12) United States Patent
Chen et al.

(10) Patent No.: US 10,810,720 B2
(45) Date of Patent: Oct. 20, 2020

(54) OPTICAL IMAGING METHOD AND APPARATUS

(71) Applicant: Huawei Technologies Co., Ltd., Shenzhen (CN)

(72) Inventors: Gang Chen, Beijing (CN); Zhongwei Tang, Shenzhen (CN); Wei Luo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/347,146

(22) PCT Filed: Dec. 22, 2016

(86) PCT No.: PCT/CN2016/111449
§ 371 (c)(1),
(2) Date: May 2, 2019

(87) PCT Pub. No.: WO2018/082165
PCT Pub. Date: May 11, 2018

(65) Prior Publication Data
US 2019/0355108 A1    Nov. 21, 2019

(30) Foreign Application Priority Data

Nov. 3, 2016  (CN) .......................... 2016 1 0958373

(51) Int. Cl.
*H04N 5/235*  (2006.01)
*G06T 5/50*  (2006.01)
(Continued)

(52) U.S. Cl.
CPC .............. *G06T 5/50* (2013.01); *G06T 3/4053* (2013.01); *H04N 5/2351* (2013.01);
(Continued)

(58) Field of Classification Search
CPC ......... G06T 5/50; G06T 3/4053; G06T 5/002; G06T 5/003; G06T 5/007;
(Continued)

(56) References Cited

U.S. PATENT DOCUMENTS 7,057,647 B1   6/2006 Monroe
8,824,833 B2   9/2014 Dagher et al.
(Continued)

FOREIGN PATENT DOCUMENTS

CN   101150731 A   3/2008
CN   101493893 A   7/2009
(Continued)

OTHER PUBLICATIONS

Foreign Communication From a Counterpart Application, European Application No. 16920687.7, Extended European Search Report dated Sep. 26, 2019, 7 pages.
(Continued)

*Primary Examiner* — Mekonnen D Dagnew
(74) *Attorney, Agent, or Firm* — Conley Rose, P.C.

(57) ABSTRACT

This application provides an imaging method. The imaging method is applied to an imaging apparatus including a color camera and a black-and-white camera, and resolution of the black-and-white camera is higher than resolution of the color camera; and the imaging method includes: obtaining a zoom magnification; simultaneously capturing a color image and a black-and-white image of a target scene, where resolution of the black-and-white image is higher than resolution of the color image; performing cropping processing on the black-and-white image and the color image separately based on the zoom magnification, where the cropped black-and-white image and the cropped color image have a same field of view; and merging the cropped color image and the cropped black-and-white image to obtain an
(Continued)

output image of the target scene. Therefore, according to the optical imaging method provided by embodiments of this application, the obtained output image can have a better optical zoom capability.

20 Claims, 7 Drawing Sheets (51) Int. Cl.
*G06T 3/40* (2006.01)
*H04N 5/247* (2006.01)
*H04N 5/262* (2006.01)
*H04N 5/265* (2006.01)
*H04N 9/04* (2006.01)
*H04N 9/78* (2006.01)
*G06T 5/00* (2006.01)

(52) U.S. Cl.
CPC ............ *H04N 5/247* (2013.01); *H04N 5/265* (2013.01); *H04N 5/2628* (2013.01); *H04N 9/04* (2013.01); *H04N 9/78* (2013.01); *G06T 5/002* (2013.01); *G06T 5/003* (2013.01); *G06T 5/007* (2013.01); *G06T 2207/10024* (2013.01); *G06T 2207/20221* (2013.01)

(58) Field of Classification Search
CPC ........... G06T 2207/10024; G06T 2207/20221; H04N 5/2351; H04N 5/247; H04N 5/2628; H04N 5/265; H04N 9/04; H04N 9/78; H04N 1/3935; H04N 9/09; H04N 1/3871; H04N 5/23232; H04N 5/2355; H04N 9/64; H04N 5/2258; H04N 5/23212; H04M 1/725
See application file for complete search history.

(56) References Cited

U.S. PATENT DOCUMENTS

| 9,325,899 | B1 | 4/2016 | Chou et al. |
| 9,414,037 | B1 | 8/2016 | Solh |
| 2010/0033602 | A1 | 2/2010 | Okada et al. |
| 2011/0064327 | A1 | 3/2011 | Dagher et al. |
| 2012/0075489 | A1 | 3/2012 | Nishihara |
| 2013/0182963 | A1 | 7/2013 | Cok |
| 2015/0078678 | A1* | 3/2015 | Grandin .................. G06T 11/60 382/284 |
| 2016/0227120 | A1 | 8/2016 | Lee et al. |
| 2016/0360103 | A1 | 12/2016 | Griffith et al. |
| 2017/0374281 | A1* | 12/2017 | Kim ..................... H04N 5/2353 |
| 2018/0160040 | A1 | 6/2018 | Shabtay et al. |

FOREIGN PATENT DOCUMENTS

| CN | 103109524 A | 5/2013 |
| CN | 103714659 A | 4/2014 |
| CN | 105049718 A | 11/2015 |
| CN | 105556944 A | 5/2016 |
| CN | 105578063 A | 5/2016 |
| CN | 105681633 A | 6/2016 |
| EP | 2852150 A1 | 3/2015 |
| JP | H08307776 A | 11/1996 |
| JP | 2001506812 A | 5/2001 |
| JP | 2004032517 A | 1/2004 |
| JP | 2010063088 A | 3/2010 |
| JP | 2013196294 A | 9/2013 |
| KR | 20160095911 A | 8/2016 |
| WO | 9815126 A1 | 4/1998 |
| WO | 2014083489 A1 | 6/2014 |
| WO | 2018072267 A1 | 4/2018 |

OTHER PUBLICATIONS

Machine Translation and Abstract of Chinese Publication No. CN101150731, Mar. 26, 2008, 25 pages.
Machine Translation and Abstract of Chinese Publication No. CN101493893, Jul. 29, 2009, 9 pages.
Machine Translation and Abstract of Chinese Publication No. CN103714659, Apr. 9, 2014, 18 pages.
Machine Translation and Abstract of Chinese Publication No. CN105049718, Nov. 11, 2015, 20 pages.
Machine Translation and Abstract of Chinese Publication No. CN105578063, May 11, 2016, 19 pages.
Machine Translation and Abstract of International Publication No. WO2018072267, Apr. 26, 2018, 36 pages.
Foreign Communication From a Counterpart Application, PCT Application No. PCT/CN2016/111449, English Translation of International Search Report dated May 31, 2017, 3 pages.
Foreign Communication From a Counterpart Application, PCT Application No. PCT/CN2016/111449, English Translation of Written Opinion dated May 31, 2017, 4 pages.
Foreign Communication From a Counterpart Application, Chinese Application No. 201680080826.0, Chinese Office Action dated Aug. 5, 2019, 8 pages.

* cited by examiner

OPTICAL IMAGING METHOD AND APPARATUS

CROSS-REFERENCE TO RELATED APPLICATIONS

This application is a national stage of International Application No. PCT/CN2016/111449, filed on Dec. 22, 2016, which claims priority to Chinese Patent Application No. 201610958373.9, filed on Nov. 3, 2016. Both of the aforementioned applications are hereby incorporated by reference in their entireties.

TECHNICAL FIELD

Embodiments of this application relate to the optical imaging field, and more specifically, to an optical imaging method and apparatus.

BACKGROUND

With development of imaging technologies, people seek higher imaging definition when shooting by using a portable terminal device with a camera. For a zoom lens, a distant object can be zoomed in by adjusting a focal length of the lens, to allow a user to distinguish details of the distant object clearly.

However, a zoom lens is generally large and is commonly used in a digital camera. Applying this technology directly to a portable terminal device (such as a mobile phone) goes against users' pursuit of thin and light portable terminal devices. Therefore, a common practice is to use a digital zoom technology to zoom in a distant object. However, this technology has an upper limit on improvement of imaging resolving power and definition. When a magnification is relatively large, an image is not clear enough.

Therefore, a technical means is urgently required to allow a terminal device to obtain higher imaging resolving power and definition while ensuring characteristics of thinness and lightness of the terminal device.

SUMMARY

Embodiments of this application provide an optical imaging method and apparatus, so as to provide higher resolving power and definition of an obtained image while ensuring characteristics of lightness and thinness of the imaging apparatus.

According to a first aspect, an imaging method is provided, where the imaging method is applied to an imaging apparatus including a color camera and a black-and-white camera, and resolution of the black-and-white camera is higher than resolution of the color camera; and the imaging method includes: obtaining a zoom magnification; simultaneously capturing a color image and a black-and-white image of a target scene, where resolution of the black-and-white image is higher than resolution of the color image; performing cropping processing on the black-and-white image and the color image separately based on the zoom magnification, where the cropped black-and-white image and the cropped color image have a same field of view; and merging the cropped color image and the cropped black-and-white image to obtain an output image of the target scene.

Therefore, according to the optical imaging method provided by this embodiment of this application, the color image captured by the color camera and the black-and-white image captured by the black-and-white camera are merged, so that the obtained output image can have a better optical zoom capability.

With reference to the first aspect, in a first possible implementation of the first aspect, the merging the cropped color image and the cropped black-and-white image to obtain an output image of the target scene includes: separating the cropped color image into a chroma component image and a luminance component image; and merging the chroma component image and the cropped black-and-white image to obtain the output image.

Therefore, the luminance component image separated from the cropped color image is replaced by the cropped black-and-white image, and the cropped black-and-white image is merged with the chroma component image to obtain the output image with higher resolving power.

With reference to the first aspect and the implementation of the first aspect, in a second possible implementation of the first aspect, before the capturing an initial color image of a target scene, the method further includes: determining, based on luminance of the target scene, a quantity of image frames captured by the color camera and a quantity of image frames captured by the black-and-white camera.

Therefore, when the scene has relatively high luminance, an imaging signal-to-noise ratio is relatively large, and therefore a relatively small quantity of frames are captured; when the scene has relatively low luminance, an imaging signal-to-noise ratio is relatively small, and therefore a relatively large quantity of frames are captured. This facilitates noise processing and image detail recovery during image merging.

With reference to the first aspect, in a third possible implementation of the first aspect, before the merging the chroma component image and the preprocessed black-and-white image, the merging the cropped color image and the cropped black-and-white image to obtain an output image of the target scene includes: performing super-resolution processing on the chroma component image and/or the cropped black-and-white image.

Specifically, if the color image captured by the color camera has M frames, M chroma component image frames and M luminance component image frames are obtained through processing, and one chroma component image frame may be obtained by performing super-resolution processing on the M chroma component image frames. Similarly, one luminance component image frame may be obtained by performing super-resolution processing on the M luminance component image frames.

Further, if the black-and-white image captured by the black-and-white camera has N frames, one black-and-white image frame may be obtained by performing super-resolution processing on the N black-and-white image frames.

Therefore, if the chroma component image obtained through super-resolution processing and the black-and-white image obtained through super-resolution processing are further merged, an output image with a better optical zoom capability can be obtained.

With reference to the first aspect and the implementations of the first aspect, in a fourth possible implementation of the first aspect, the merging the cropped color image and the cropped black-and-white image to obtain an output image of the target scene includes: separating the cropped color image into a chroma component image and a luminance component image; replacing high frequency information of the luminance component image with high frequency information of the cropped black-and-white image to obtain an optical variable luminance component image; and merging the chroma component image and the optical variable luminance component image to obtain the output image.

In other words, the high frequency information of the luminance component image is replaced by the high frequency information of the cropped black-and-white image to obtain the optical variable luminance component image. Further, the optical variable luminance component image is merged with the chroma component image to obtain the output image.

With reference to the first aspect and the implementations of the first aspect, in a fifth possible implementation of the first aspect, before the merging the chroma component image and the preprocessed black-and-white image, the merging the cropped color image and the cropped black-and-white image to obtain an output image of the target scene includes: performing super-resolution processing on the chroma component image; and/or performing super-resolution processing on the luminance component image; and/or performing super-resolution processing on the cropped black-and-white image.

With reference to the first aspect and the implementations of the first aspect, in a sixth possible implementation of the first aspect, when the cropped black-and-white image has N frames, the performing super-resolution processing on the cropped black-and-white image includes: when the target scene is a high luminance scene, performing super-resolution processing by using N1 black-and-white image frames in the N image frames; or when the target scene is not a high luminance scene, performing super-resolution processing by using N2 black-and-white image frames in the N image frames, where each of N, N1, and N2 is a positive integer, and N1<N2≤N.

Therefore, in this embodiment of this application, advantages of the black-and-white image in terms of resolving power and definition can be utilized to improve resolving power and definition of a final zoom imaging luminance component, thereby improving definition and resolving power of the final output image.

With reference to the first aspect and the implementations of the first aspect, in a seventh possible implementation of the first aspect, the method further includes: adjusting an imaging parameter of the output image based on the luminance of the target scene, where the imaging parameter includes at least one of the following parameters: a noise reduction parameter, a sharpening parameter, or a contrast.

Therefore, according to the method in this embodiment of this application, imaging parameters can be configured based on different scenes. This can ensure imaging quality of a final optical variable image.

According to a second aspect, an imaging apparatus is provided, including: an optical zoom module, where the optical zoom module is configured to obtain a zoom magnification; a color camera, where the color camera is configured to capture a color image of a target scene; and a black-and-white camera, where the black-and-white camera is configured to capture a black-and-white image of the target scene at the same time when the color image is captured, where resolution of the black-and-white image is higher than resolution of the color image; where the optical zoom module is further configured to: perform cropping processing on the black-and-white image and the color image separately based on the zoom magnification, where the cropped black-and-white image and the cropped color image have a same field of view; and merge the cropped color image and the cropped black-and-white image to obtain an output image of the target scene.

With reference to the second aspect, in a first possible implementation of the second aspect, the optical zoom module is specifically configured to: separate the cropped color image into a chroma component image and a luminance component image; and merge the chroma component image and the cropped black-and-white image to obtain the output image.

With reference to the second aspect, in a second possible implementation of the second aspect, the optical zoom module is specifically configured to: separate the cropped color image into a chroma component image and a luminance component image; replace high frequency information of the luminance component image with high frequency information of the cropped black-and-white image to obtain an optical variable luminance component image; and merge the chroma component image and the optical variable luminance component image to obtain the output image.

With reference to the second aspect, in a third possible implementation of the second aspect, the imaging apparatus further includes a scene control module, where the scene control module is configured to: determine, based on luminance of the target scene, a quantity of image frames captured by the color camera and a quantity of image frames captured by the black-and-white camera.

With reference to the second aspect, in a fourth possible implementation of the second aspect, the optical zoom module is specifically configured to: perform super-resolution processing on the chroma component image; and/or perform super-resolution processing on the luminance component image; and/or perform super-resolution processing on the cropped black-and-white image.

With reference to the second aspect, in a fifth possible implementation of the second aspect, when the cropped black-and-white image has N frames, the optical zoom module is specifically configured to: when the target scene is a high luminance scene, perform super-resolution processing by using N1 black-and-white image frames in the N image frames; or when the target scene is not a high luminance scene, perform super-resolution processing by using N2 black-and-white image frames in the N image frames, where each of N, N1, and N2 is a positive integer, and N1<N2≤N.

With reference to the second aspect, in a sixth possible implementation of the second aspect, the imaging apparatus is further configured to adjust an imaging parameter of the output image based on the luminance of the target scene, where the imaging parameter includes at least one of the following parameters: a noise reduction parameter, a sharpening parameter, or a contrast.

With reference to the second aspect, in a seventh possible implementation of the second aspect, the color camera includes an optical image stabilization module, and/or the black-and-white camera includes an optical image stabilization module.

Therefore, because sensors of the black-and-white camera and the color camera are different, impact on the black-and-white camera and the color camera resulting from shake is different. An independent optical image stabilization module can individually prevent imaging blur caused by shake of each camera.

According to a third aspect, an optical imaging apparatus is provided, including: a color camera, where the color camera is configured to capture a dynamic or static color image of a target scene; a black-and-white camera, where the black-and-white camera is configured to capture a dynamic or static black-and-white image of the target scene at the same time when the color image is captured, where resolution of the black-and-white image is higher than resolution of the color image; a memory, where the memory is configured to store the color image captured by the color camera and the black-and-white image captured by the black-and-white camera; a processor, where the processor is configured to: obtain a zoom magnification; perform cropping processing on the black-and-white image and the color image separately based on the zoom magnification, where the cropped black-and-white image and the cropped color image have a same field of view; and merge the cropped color image and the cropped black-and-white image to obtain an output image of the target scene; and a screen, where the screen is configured to display the output image.

It should be understood that the processor is configured to execute an instruction in a memory, and the execution allows the processor to perform the method in the first aspect or any possible implementation of the first aspect.

According to a fourth aspect, a computer readable medium is provided, where the computer readable medium is configured to store a computer program, and the computer program includes an instruction for performing the method in the first aspect or any possible implementation of the first aspect.

DESCRIPTION OF EMBODIMENTS

The following clearly and completely describes the technical solutions in the embodiments of this application with reference to the accompanying drawings in the embodiments of this application.

Figure 1:
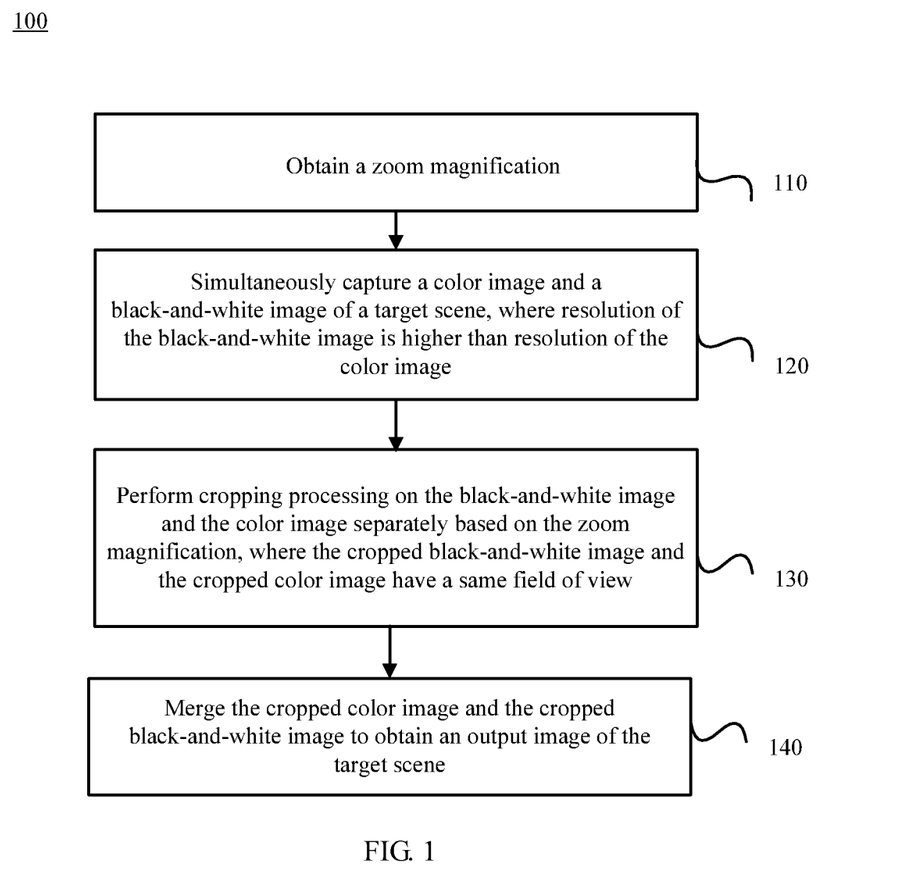
FIG. 1 shows a schematic diagram of an imaging method according to an embodiment of this application.

FIG. 1 shows a schematic flowchart of an imaging method according to an embodiment of this application. The imaging method is applied to an imaging apparatus including a color camera and a black-and-white camera, and resolution of the black-and-white camera is higher than resolution of the color camera. As shown in FIG. 1, the method 100 includes the following steps.

Step 110: Obtain a zoom magnification.

Step 120: Simultaneously capture a color image and a black-and-white image of a target scene, where resolution of the black-and-white image is higher than resolution of the color image.

Step 130: Perform cropping processing on the black-and-white image and the color image separately based on the zoom magnification, where the cropped black-and-white image and the cropped color image have a same field of view.

Step 140: Merge the cropped color image and the cropped black-and-white image to obtain an output image of the target scene.

Figure 2:
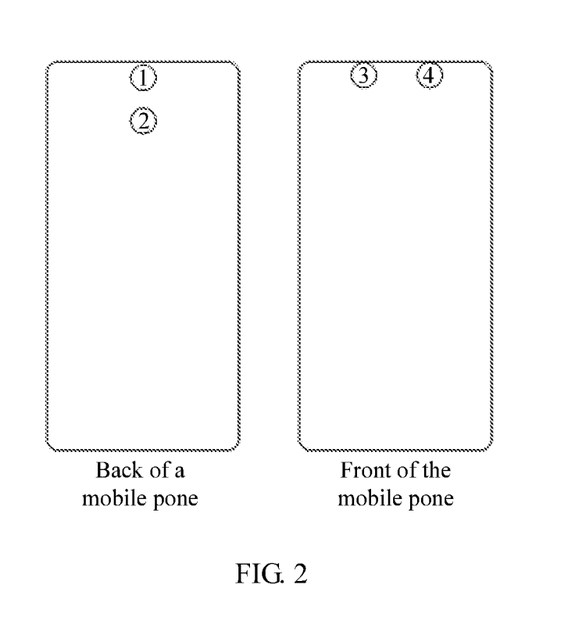
FIG. 2 shows a schematic diagram of an imaging apparatus according to an embodiment of this application.

FIG. 2 shows a schematic diagram of an imaging apparatus according to an embodiment of this application. As shown in FIG. 2, a black-and-white camera and a color camera may be located in the front of a terminal device, or may be located at the back of the terminal device. The black-and-white camera and the color camera may be arranged horizontally or vertically. This is not limited in this application.

It should be understood that for a black-and-white camera, its imaging principle determines that the black-and-white camera has higher resolving power and a better detail rendering capability than a color camera that has same resolution as the black-and-white camera. Specifically, if the black-and-white camera and the color camera have same resolution and a same pixel size (English: pixel size), in a diagonal direction, resolving power of an image captured by the black-and-white camera is twice as high as that of an image captured by the color camera.

Further, if a black-and-white camera with higher resolution is used, for example, a ratio of imaging resolution of the black-and-white camera to imaging resolution of the color camera is T, an output image obtained by merging an image captured by the black-and-white camera and an image captured by the color camera has an optical zoom capability that is improved by T times in a horizontal direction and in a vertical direction and improved by 2T times in a diagonal direction, on a basis of an original zoom capability of the color camera. For example, resolution of a color camera 101 is 12M (3968×2976), and resolution of a black-and-white camera 102 is 20M (5120×3840). In this case, an optical zoom capability is improved by 5120/3968 times on a basis of an original zoom capability of the color camera.

The zoom capability is a capability to zoom in an image when specific image definition is met.

Specifically, in step 110, the obtained zoom magnification is a magnification selected by a user, for example, 1.5 times zoom (1.5×), 2 times zoom (2×), 3 times zoom (3×), or the like.

It should be understood that the user may select a zoom magnification by using a zoom magnification button of the imaging apparatus or by inputting a gesture command on a screen of the imaging apparatus. Further, when a shooting button of the imaging apparatus is pressed or a gesture command is input on the screen of the imaging apparatus, the black-and-white camera and the color camera simultaneously capture an image of the target scene. Within an exposure time, the color camera may capture M color image frames, and the black-and-white camera may capture N black-and-white image frames, where M and N are positive integers.

In step 130, that cropping processing is performed on the black-and-white image based on the zoom magnification S means that the black-and-white image initially captured by the black-and-white camera is cropped with a center of the image as an origin, so that both a length and a width of the cropped preprocessed black-and-white image become 1/S of a length and a width of an original black-and-white image, respectively, and a size of the entire preprocessed black-and-white image becomes $1/S^2$ of a size of the original black-and-white image. For example, when the zoom magnification is 2×, both the length and the width of the preprocessed black-and-white image obtained through cropping the original black-and-white image with the center of the image as the origin are ½ of the length and the width of the original black-and-white image, respectively, and the size of the preprocessed black-and-white image becomes ¼ of the size of the original black-and-white image.

It should be understood that, herein, the cropped black-and-white image may be referred to as a preprocessed black-and-white image, and the cropped color image may be referred to as a preprocessed color image.

Figure 3:
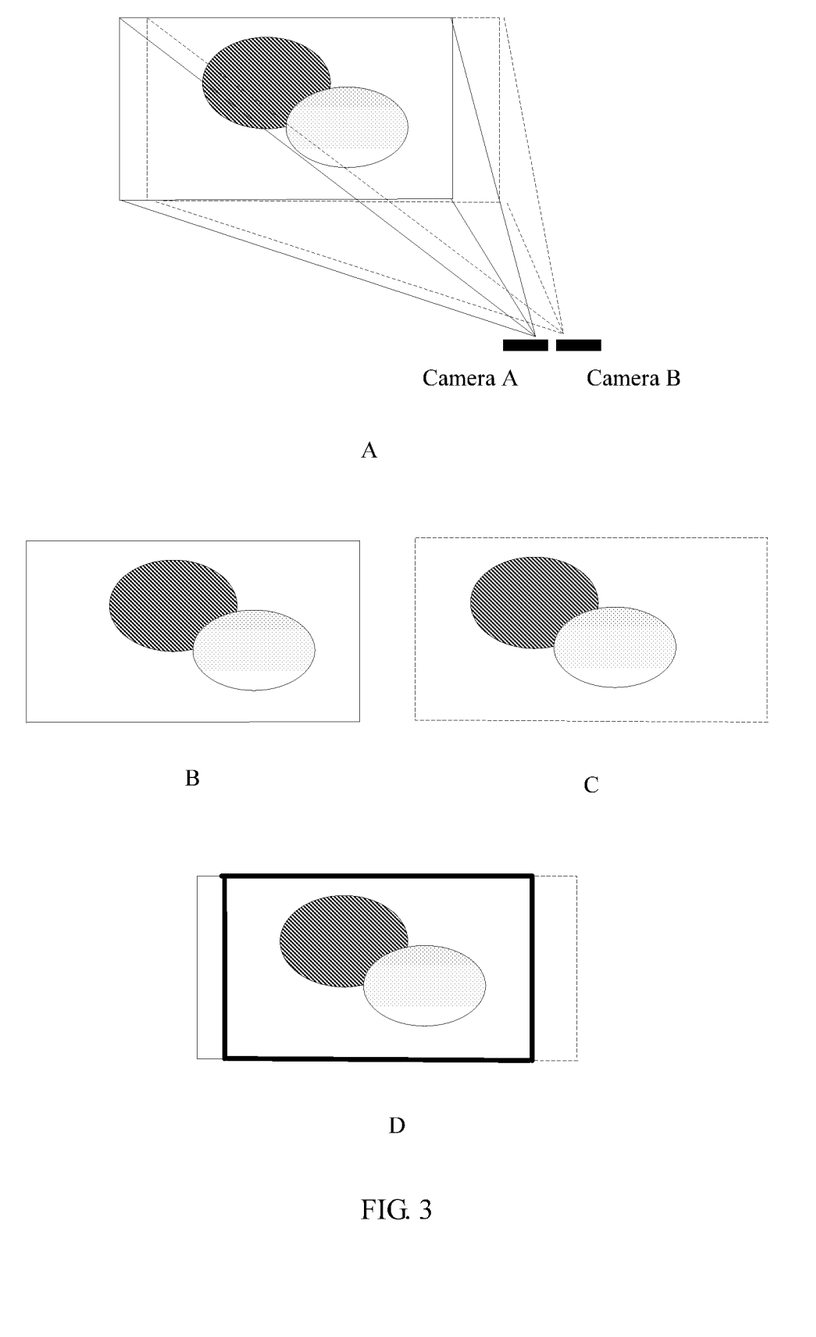
FIG. 3 shows a schematic diagram of a field of view according to an embodiment of this application.

Further, in step 130, the preprocessed black-and-white image and the preprocessed color image have a same field of view (English: Field Of View, FOV for short). FIG. 3 shows a schematic diagram of a field of view according to an embodiment of this application. As shown in FIG. 3, FIG. 3A shows a schematic diagram provided when a camera A and a camera B separately shoot a same target scene, FIG. 3B is an image captured by the camera A, and FIG. 3C is an image captured by the camera B. Due to an arrangement manner of the camera A and the camera B, obtained images B and C also have different fields of view. Therefore, two images with a same field of view can be obtained through cropping, for example, through reserving an overlapped part of FIG. 3B and FIG. 3C, that is, FIG. 3D.

Therefore, according to the optical imaging method provided by this embodiment of this application, the color image captured by the color camera and the black-and-white image captured by the black-and-white camera are merged, so that the obtained output image can have a better optical zoom capability.

Optionally, in one implementation of this application, the merging the cropped color image and the cropped black-and-white image to obtain an output image of the target scene includes: separating the cropped color image into a chroma component image and a luminance component image; and merging the chroma component image and the cropped black-and-white image to obtain the output image.

In other words, the luminance component image of the preprocessed color image is replaced by the preprocessed black-and-white image, and the preprocessed black-and-white image is merged with the chroma component image to obtain an output image with higher resolving power.

Further, the preprocessed black-and-white image is actually a luminance information image, and the preprocessed black-and-white image can render more image details than the luminance component image of the color image. Therefore, when the luminance component image of the color image is replaced by the preprocessed black-and-white image, and the preprocessed black-and-white image is further merged with the chroma component image of the color image, the output image with a better optical zoom capability can be obtained.

Specifically, the preprocessed image is transformed to space in which chroma and luminance are separated, such as hsv space, lab space, and yuv space, and luminance and chroma signals of the color image captured by the color camera are separated, to obtain the luminance component image and the chroma component image. A purpose of this operation is to allow a subsequent algorithm to be used for independent processing on the chroma and luminance of the image, without affecting the chroma of the image during luminance processing or affecting the luminance of the image during chroma processing on the image.

Specific explanation of the foregoing several color models is as follows.

An HSV color model includes hue (English: Hue, H for short), saturation (English: Saturation, S for short), and value (English: Value, V for short).

A Lab color model includes three elements: luminosity (L), and color-relevant a and b. L represents luminosity (English: Luminosity, L for short), a represents a range from magenta to green, and b represents a range from yellow to blue.

In a YUV color model, "Y" represents luminance (Luminance or Luma), that is, a gray scale value, and "U" and "V" represent chroma (Chrominance or Chroma).

Specifically, to further improve the zoom capability of the imaging apparatus, super-resolution processing is required. The super-resolution processing can improve original image resolution by using a hardware or software method, for example, by using an interpolation-based image super-resolution technology, a reconstruction-based image super-resolution technology, a deep-learning-based image super-resolution technology, or the like. This is not limited in this embodiment of this application.

For the preprocessed color image, a super-resolution module can zoom in the preprocessed color image to image resolution corresponding to a zoom ratio selected by a user. In other words, the result is actually a digital zoom result and has a specific limitation on the resolving power and definition of the image.

It should be understood that for the color camera, M image frames may be captured within an exposure time, where M is a positive integer greater than or equal to 1, and then one processed image frame is obtained through super-resolution processing on the M image frames.

For the preprocessed black-and-white image, assuming that a zoom ratio selected by the user is z (for example, 1.5× zoom, 2× zoom, or the like is selected), and a ratio of imaging resolution of the black-and-white camera to that of the color camera is T. In a first case, when $z<T$, time-domain multi-frame noise reduction is performed on the preprocessed black-and-white image, and then the image is zoomed out to image resolution corresponding to the zoom ratio selected by the user, so that the to-be-merged chroma component image has a same size with the zoomed-out preprocessed black-and-white image. The processed black-and-white image retains advantages of imaging details and resolving power while improving an imaging signal-to-noise ratio.

In a second case, if $z>T$, super-resolution processing is performed on the black-and-white image captured by the black-and-white camera, and the image is zoomed in to image resolution corresponding to the zoom ratio selected by the user, so that the to-be-merged chroma component image has a same size with the zoomed-in preprocessed black-and-white image. This processing actually extends the optical zoom capability, and combines optical zoom and digital zoom, so as to obtain a larger zoom ratio. Because of advantages of the black-and-white camera in terms of resolving power and definition, although the result is digital zoom, compared with a digital zoom result of a conventional camera, the resolving power and definition of the black-and-white camera are greatly improved.

It should be understood that when $z=T$, multi-time-domain noise reduction processing instead of image zoom-in or zoom-out is performed on the preprocessed black-and-white image.

It should be understood that for the black-and-white camera, N image frames may be captured within an exposure time, where N is an integer greater than or equal to 1, and then one processed image frame is obtained through super-resolution processing on the N image frames.

It should further be understood that N and M may be the same or different.

In other words, super-resolution processing is performed on the preprocessed black-and-white image, and then the preprocessed black-and-white image is merged with the chroma component image; and the luminance component image of the preprocessed color image is replaced by the preprocessed black-and-white image, and the preprocessed black-and-white image is merged with the chroma component image to obtain an output image with higher resolving power.

When the black-and-white image captured by the black-and-white camera has N frames, the performing super-resolution processing on the cropped black-and-white image includes: when the target scene is a high luminance scene, performing super-resolution processing by using N1 black-and-white image frames in the N image frames; or when the target scene is not a high luminance scene, performing super-resolution processing by using N2 black-and-white image frames in the N image frames, where each of N, N1, and N2 is a positive integer, and N1<N2≤N.

This is because in a low luminance scene, noise is high, and a plurality of frames are required for super-resolution processing to recover a high-frequency signal of the black-and-white image, while in a high luminance scene, noise is low, and a plurality of frames are not required, for example, one frame may be required for super-resolution processing to recover a high-frequency signal of the black-and-white image.

Optionally, in an embodiment of this application, the merging the preprocessed color image and the preprocessed black-and-white image to obtain an output image of the target scene includes: separating the preprocessed color image into a chroma component image and a luminance component image; replacing high frequency information of the luminance component image with high frequency information of the preprocessed black-and-white image to obtain an optical variable luminance component image; and merging the chroma component image and the chroma component image to obtain the output image.

Different from the foregoing embodiment in which the luminance component image of the preprocessed color image is simply replaced by the preprocessed black-and-white image, in this embodiment, only the high frequency information of the luminance component image of the color image is replaced by the high frequency information of the preprocessed black-and-white image to obtain the optical variable luminance component image, and further, the optical variable luminance component image is merged with the chroma component image to obtain the output image.

It should be understood that high frequency information and low frequency information of an image are metrics for intensity changes among various image positions, where the low frequency information is mainly a comprehensive metric for intensity of the entire image, and the high frequency information is mainly a metric for an image edge and an image contour. The high frequency information is a relative concept, and high frequency information obtained by using different filters is also different. For example, in an embodiment of this application, a Gaussian filter may be used to obtain the high frequency information of the image. The high frequency information of the image reflects image details. Therefore, the high frequency information of the luminance component image of the color image is replaced by the high frequency information of the preprocessed black-and-white image, so that resolving power and resolution of the obtained optical variable luminance component image can also be improved.

The optical variable luminance component image and the chroma component image of the color image are merged, and in other words, inverse transformation of color space transformation is performed to finally obtain the output image. Therefore, in this embodiment of this application, advantages of the black-and-white image in terms of resolving power and definition can be utilized to improve resolving power and definition of a final zoom imaging luminance component, thereby improving definition and resolving power of the final output image.

It should be understood that the chroma component image may alternatively be an image obtained through super-resolution processing.

Further, after step 140, the imaging apparatus displays an output image with higher definition and better resolving power on a display interface.

Optionally, in an embodiment of this application, before the simultaneously capturing a color image and a black-and-white image of a target scene, the method further includes: determining, based on luminance of the target scene, a quantity of image frames captured by the color camera within an exposure time and a quantity of image frames captured by the black-and-white camera within the exposure time.

The imaging apparatus can determine, based on the luminance of the target scene, a quantity of image frames captured by each of the two cameras in an optical variable scene. When the scene has relatively high luminance, an imaging signal-to-noise ratio is relatively large, and therefore a relatively small quantity of frames are captured; when the scene has relatively low luminance, an imaging signal-to-noise ratio is relatively small, and therefore a relatively large quantity of frames are captured. This facilitates noise processing and image detail recovery during image merging.

Optionally, in an embodiment of this application, the scene control module 204 is further configured to adjust an imaging parameter of the optical zoom module based on a zoom mode of the target scene, where the imaging parameter includes at least one of the following parameters: a noise reduction parameter, a sharpening parameter, or a contrast.

In other words, in addition, the module can control an image signal processing (Image Signal Processing, ISP for short) module 203 to adjust noise reduction, sharpening, a contrast, and dynamic range. In a high luminance scene, the ISP module is controlled to disable a noise reduction and sharpening module. In a low luminance scene, the ISP module is controlled to enable the noise reduction and sharpening module and adjust parameters to an appropriate level.

In addition, a contrast and a dynamic range parameter can be adjusted in a targeted manner in different zoom modes based on differences between the contrast and the dynamic range parameter in the zoom mode and a contrast and a dynamic range parameter in a normal photo mode.

Therefore, according to the method in this embodiment of this application, imaging parameters can be configured based on different scenes. This can ensure imaging quality of a final optical variable image.

Figure 4:
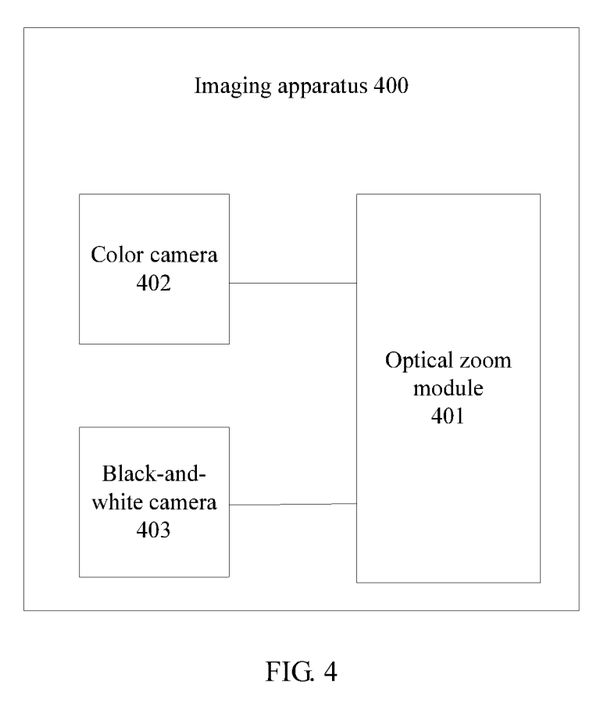
FIG. 4 shows a schematic diagram of an imaging apparatus according to an embodiment of this application.

FIG. 4 shows a schematic diagram of an imaging apparatus according to an embodiment of this application. As shown in FIG. 2, the imaging apparatus 400 includes:

an optical zoom module 401, where the optical zoom module 401 is configured to obtain a zoom magnification;

a color camera 402, where the color camera 402 is configured to capture a color image of a target scene; and a black-and-white camera 403, where the black-and-white camera 403 is configured to capture a black-and-white image of the target scene at the same time when the color image is captured, where resolution of the black-and-white image is higher than resolution of the color image.

The optical zoom module 403 is further configured to: perform cropping processing on the black-and-white image and the color image separately based on the zoom magnification, where the cropped black-and-white image and the cropped color image have a same field of view; and merge the cropped color image and the cropped black-and-white image to obtain an output image of the target scene.

Therefore, the imaging apparatus provided by this embodiment of this application merges, by using the optical zoom module, the color image captured by the color camera and the black-and-white image captured by the black-and-white camera, so that the obtained output image can have a better optical zoom capability.

Optionally, in an embodiment of this application, the optical zoom module is specifically configured to: separate the cropped color image into a chroma component image and a luminance component image; and merge the chroma component image and the cropped black-and-white image to obtain the output image.

Optionally, to further improve the zoom capability of the imaging apparatus, there may be a super-resolution module in the optical zoom module 401. The super-resolution module can improve the original image resolution by using a hardware or software method.

When the color camera 402 captures M image frames within an exposure time, the super-resolution module merges the M image frames into one image frame during super-resolution processing, where M is an integer greater than or equal to 1.

When the black-and-white camera 403 captures N image frames within the exposure time, the super-resolution module merges the N image frames into one image frame during super-resolution processing, where N is an integer greater than or equal to 1.

Optionally, in an embodiment of this application, the optical zoom module 401 is specifically configured to: separate the cropped color image into a chroma component image and a luminance component image; replace high frequency information of the luminance component image with high frequency information of the cropped black-and-white image to obtain an optical variable luminance component image; and merge the chroma component image and the optical variable luminance component image to obtain the output image.

It should be understood that the optical zoom module can execute the corresponding method described in the embodiment shown in FIG. 1. For brevity, details are not repeated.

Figure 5:
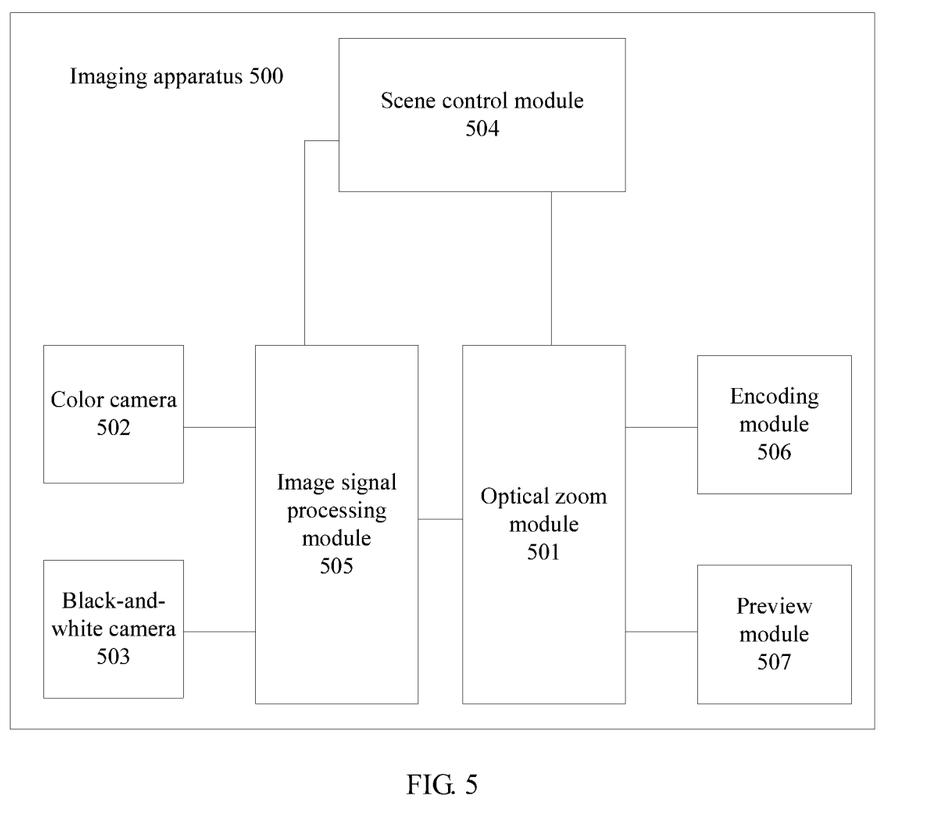
FIG. 5 shows a schematic diagram of an imaging apparatus according to another embodiment of this application.

Optionally, in an embodiment of this application, as shown in FIG. 5, FIG. 5 shows a schematic diagram of an imaging apparatus according to an embodiment of this application. The imaging apparatus 500 includes an optical zoom module 501, a color camera 502, a black-and-white camera 503, a scene control module 504, an image signal processing module 505, an encoding module 506, and a preview module 507.

Functions that can be performed by the color camera 502, the black-and-white camera 503, and the optical zoom module 501 are similar to the functions that can be performed in the embodiment shown in FIG. 4, and details are not repeated. The image signal processing module 505 is configured to transform a color image of a target scene into a yuv image, and perform basic image processing operations such as image correction, noise reduction, sharpening, and color management. The encoding module 506 is mainly configured to compress and encode the yuv image to generate an image in a specific format (for example, a jpg format). The preview module 507 is configured to send an image frame to a display screen to present a real-time picture to a user.

The scene control module 504 is configured to: determine, based on luminance of the target scene, a quantity of image frames captured by the color camera within an exposure time and a quantity of image frames captured by the black-and-white camera within the exposure time.

Specifically, the scene control module 504 controls a quantity of image frames captured by each of the two cameras in an optical variable scene. When the scene has relatively high luminance, an imaging signal-to-noise ratio is relatively large, and therefore a relatively small quantity of frames are captured; when the scene has relatively low luminance, an imaging signal-to-noise ratio is relatively small, and therefore a relatively large quantity of frames are captured.

Optionally, in an embodiment of this application, the scene control module 504 is further configured to adjust an imaging parameter of the optical zoom module based on a zoom mode of the target scene, where the imaging parameter includes at least one of the following parameters: a noise reduction parameter, a sharpening parameter, or a contrast.

In other words, in addition, the module can control the image signal processing (Image Signal Processing, ISP for short) module 505 to adjust noise reduction, sharpening, a contrast, and dynamic range. In a high luminance scene, the ISP module is controlled to disable a noise reduction and sharpening module. In a low luminance scene, the ISP module is controlled to enable the noise reduction and sharpening module and adjust parameters to an appropriate level.

In addition, the ISP module 505 can be controlled to adjust the contrast and the dynamic range parameter in a targeted manner in the zoom mode based on differences between the contrast and the dynamic range parameter in the zoom mode and a contrast and a dynamic range parameter in a normal photo mode.

In other words, imaging parameters of the ISP module are configured based on different scenes. This can ensure imaging quality of a final optical variable image.

Optionally, in an embodiment of this application, the color camera includes an optical image stabilization module, and/or the black-and-white camera includes an optical image stabilization module.

In other words, an optical image stabilization (English: Optical Image Stabilization, OIS for short) module may be added to each of the black-and-white camera and the color camera. It should be understood that in a zoom scene, imaging definition is more sensitive to shake of a mobile phone, and addition of the OIS module can prevent imaging blur caused by shake of the mobile phone, and greatly improve zoom shooting quality. Further, because sensors of the color camera and the black-and-white camera are different, impact on the color camera and the black-and-white camera resulting from same shake is different. Addition of the independent OIS module can help both the color camera and the black-and-white camera well prevent imaging blur caused by shake.

Figure 6:
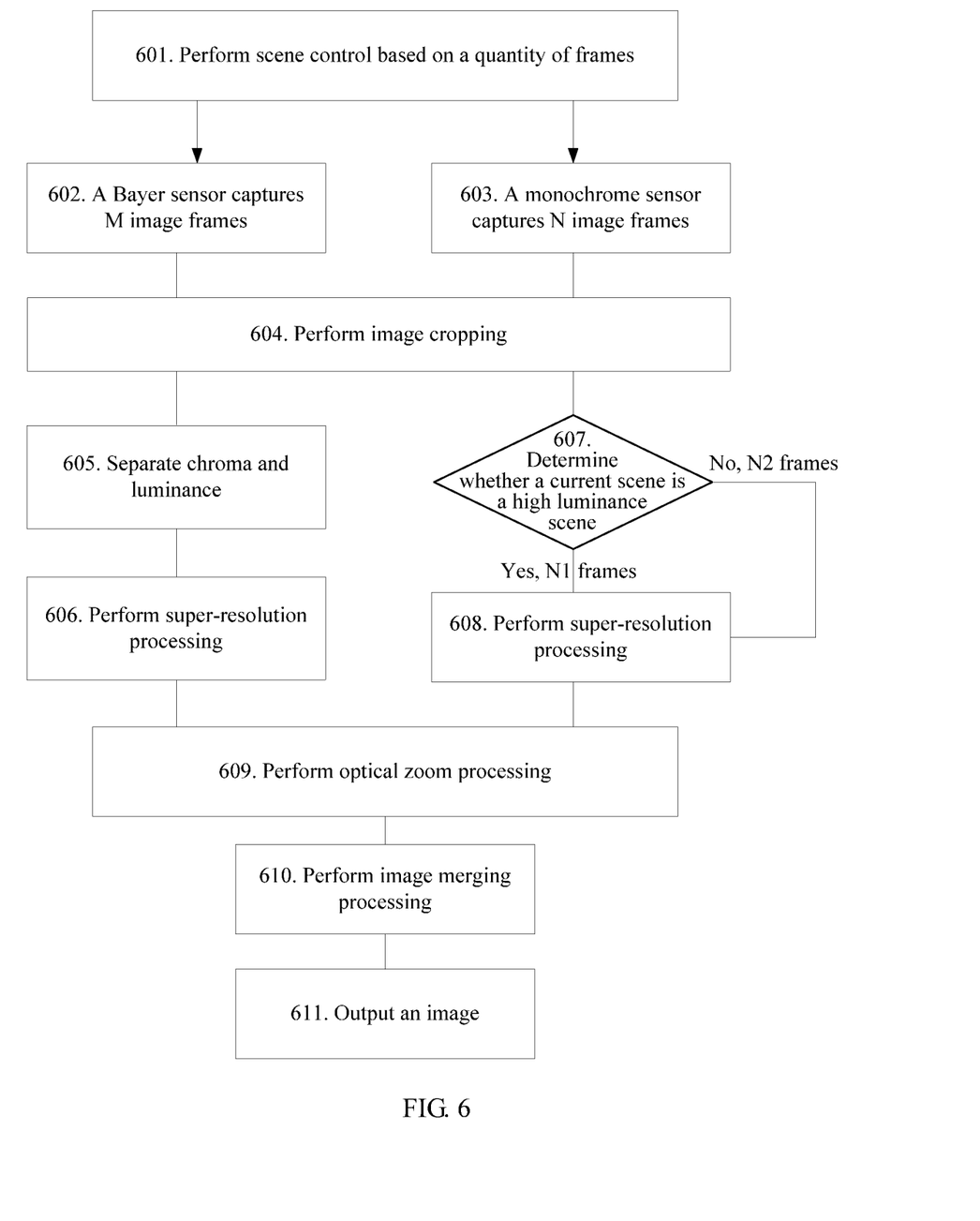
FIG. 6 shows a schematic flowchart of a method according to an embodiment of this application.

FIG. 6 is a schematic flowchart of a method according to an embodiment of this application. An execution body of the method may be the imaging apparatus shown in FIG. 4 or FIG. 5. As shown in FIG. 6, the method includes the following steps.

Step 601: Control a quantity of image frames captured by each of two cameras in an optical variable scene. When the scene has relatively high luminance, an imaging signal-to-noise ratio is relatively large, and therefore a relatively small quantity of frames are captured; when the scene has relatively low luminance, an imaging signal-to-noise ratio is relatively small, and therefore a relatively large quantity of frames are captured.

In addition, an ISP module is controlled to adjust noise reduction, sharpening, a contrast, and dynamic range. In a high luminance scene, the noise reduction and sharpening module is disabled. In a low luminance scene, the noise reduction and sharpening module is enabled, and parameters are adjusted to an appropriate level. A contrast and a dynamic range parameter need to be adjusted in the ISP module in a targeted manner in a zoom mode based on differences between the contrast and the dynamic range parameter in the zoom mode and a contrast and a dynamic range parameter in a normal photo mode.

Step 602: A Bayer sensor of the color camera captures M image frames.

Step 603: A monochrome sensor of the black-and-white camera captures N image frames.

Step 604: Perform image cropping, that is, separately crop, based on a magnification selected by a user, an image captured by the color camera and an image captured by the black-and-white camera, so that the cropped black-and-white image and the cropped color image have a same field of view.

Step 605: Separate chroma and luminance to transform an image signal of the color camera to space in which chroma and luminance are separated, such as hsv space, lab space, and yuv space, so as to separate a luminance signal and a chroma signal of the color camera. Then, independent processing can be performed on the chroma and the luminance of the image without affecting the chroma of the image during luminance processing or affecting the luminance of the image during chroma processing. In other words, the M cropped color image frames are separated into M chroma component image frames and M luminance component image frames.

Step 606: Perform super-resolution processing, that is, perform super-resolution processing on both the M chroma component image frames and the M luminance component image frames to obtain one processed chroma component image frame and one processed luminance component image frame.

Step 607: Determine whether a current target scene is a high luminance scene; and if the current target scene is a high luminance scene, N1 frames may be used; or if the current target scene is not a high luminance scene, that is, a low luminance scene, N2 frames may be used, where N1<N2≤N, and each of N, N1, and N2 is a positive integer. This is because in a low luminance scene, noise is high, and a plurality of frames are required for super-resolution processing to recover a high-frequency signal of the black-and-white image, while in a high luminance scene, noise is low, and a plurality of frames are not required, for example, one frame may be required for super-resolution processing to recover a high-frequency signal of the black-and-white image.

Step 609: Perform optical zoom processing. The optical zoom processing includes at least two optional implementations. In implementation 1, the luminance component image that has undergone the super-resolution processing is replaced by the black-and-white image that has undergone the super-resolution processing, to obtain an optical variable luminance component image. In implementation 2, a high-frequency signal of the luminance component that has undergone the super-resolution processing is replaced by a high-frequency signal of the black-and-white image that has undergone the super-resolution processing, to obtain an optical variable luminance component image.

It should be understood that step 609 may further include the corresponding process and method in the embodiment shown in FIG. 1, and details are not repeated herein.

Step 610: Merge the chroma component image and the optical variable luminance image obtained in step 609, to obtain a final output image.

Step 611: Output the image and display the output image on a display screen of the imaging apparatus.

Figure 7:
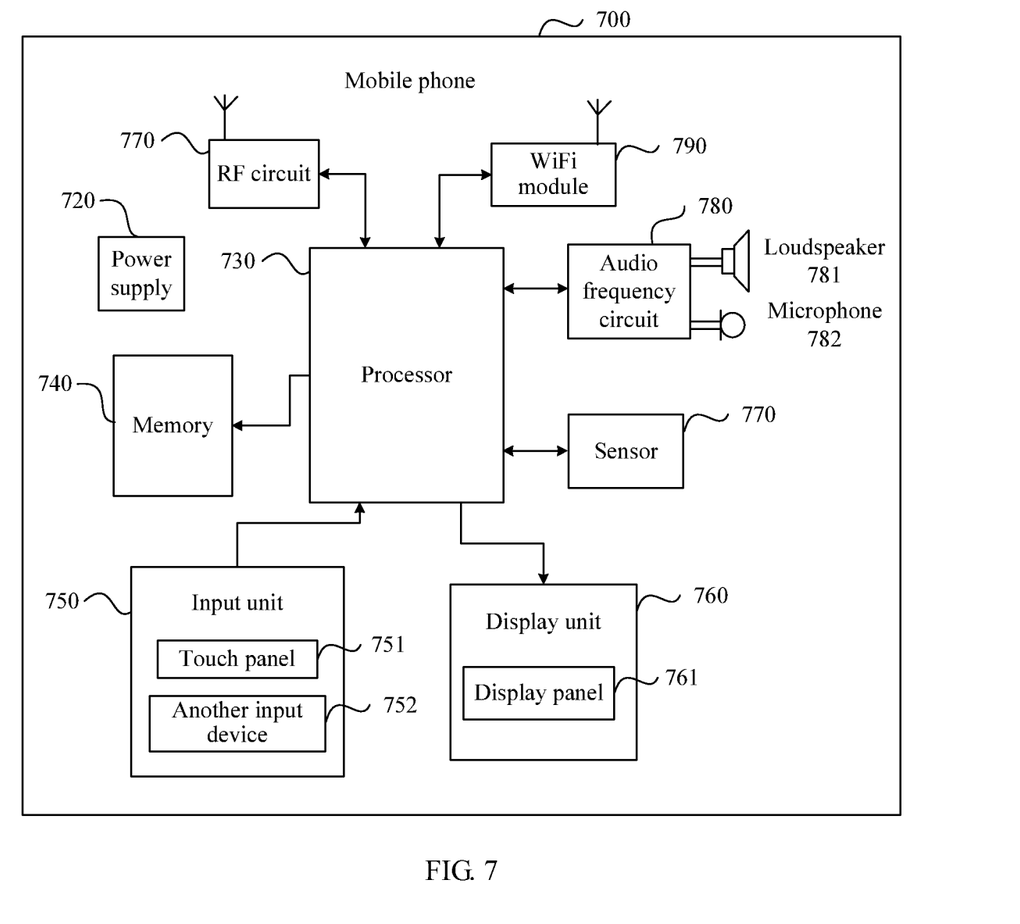
FIG. 7 shows a schematic diagram of a terminal device according to an embodiment of this application.

FIG. 7 shows a terminal device 700 according to an embodiment of the present invention. An example in which the terminal device is a mobile phone is used. FIG. 7 shows a block diagram of a partial structure of a mobile phone 700 related to this embodiment of the present invention. Referring to FIG. 7, the mobile phone 700 includes components such as a radio frequency (Radio Frequency, RF) circuit 710, a power supply 720, a processor 730, a memory 740, an input unit 750, a display unit 760, a sensor 770, an audio frequency circuit 780, and a Wireless Fidelity (wireless fidelity, WiFi) module 790. In this embodiment of the present invention, the sensor 770 includes a black-and-white camera and a color camera. A person skilled in the art can understand that the mobile phone structure shown in FIG. 7 does not constitute any limitation on the mobile phone, and the mobile phone may include more or fewer components than those shown in the figure, or a combination of some components, or differently disposed components.

The following describes the components of the mobile phone 700 in detail with reference to FIG. 7.

The RF circuit 710 can be configured to receive and send a signal in a process of receiving and sending information or during a call; and in particular, after receiving downlink information of a base station, the RF circuit 710 sends the downlink information to the processor 730 for processing. In addition, the RF circuit 710 sends uplink-related data to the base station. Generally, the RF circuit includes but is not limited to an antenna, at least one amplifier, a transceiver, a coupler, a low noise amplifier (Low Noise Amplifier, LNA), a duplexer, and the like. In addition, the RF circuit 710 may also communicate with a network and another device through radio communication. Any communications standard or protocol may be used for the radio communication, including but not limited to Global System for Mobile Communications (Global System of Mobile communication, GSM), general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, short messaging service (short messaging service, SMS), and the like.

The memory 740 may be configured to store a software program and a module. The processor 730 executes various function applications of the mobile phone 700 and data processing by running the software program and the module stored in the memory 740. The memory 740 may mainly include a program storage area and a data storage area. The program storage area may store an operating system, an application program required by at least one function (such as a voice playback function and an image playback function), and the like. The data storage area may store data (such as audio data and a phone book) that is created based on use of the mobile phone 700, and the like. In addition, the memory 740 may include a high-speed random access memory, and may further include a non-volatile memory such as at least one magnetic disk storage device, a flash memory device, or another volatile solid-state storage device.

The input unit 750 may be configured to receive input digital or character information, and generate key signal input related to a user setting and function control of the mobile phone 700. Specifically, the input unit 750 may include a touch panel 751 and another input device 752. The touch panel 751, also referred to as a touchscreen, may collect a touch operation performed by a user on or near the touch panel 751 (for example, an operation performed on or near the touch panel 751 by the user by using a finger, a stylus, or any other suitable object or accessory), and drive a corresponding connection apparatus according to a preset program. Optionally, the touch panel 751 may include two parts: a touch detection apparatus and a touch controller. The touch detection apparatus detects a touch azimuth of a user, detects a signal generated by a touch operation, and transmits the signal to the touch controller. The touch controller receives touch information from the touch detection apparatus, converts the touch information into contact coordinates, and sends the contact coordinates to the processor 730, and can receive a command sent by the processor 730 and execute the command. In addition, the touch panel 751 may be implemented by using multiple types, such as a resistive type, a capacitive type, an infrared type, and a surface acoustic wave type. In addition to the touch panel 751, the input unit 750 may include the another input device 752. Specifically, the another input device 752 may include but is not limited to one or more of a physical keyboard, a function key (such as a volume control key or an on/off key), a trackball, a mouse, and a joystick.

The display unit 760 may be configured to display information input by the user or information provided for the user, and various menus of the mobile phone 700. The display unit 760 may include a display panel 761. Optionally, the display panel 761 may be configured in a form of an LCD, an OLED, or the like. Further, the touch panel 751 may cover the display panel 761. After detecting a touch operation on or near the touch panel 751, the touch panel 751 transmits information about the touch operation to the processor 730 to determine a touch event type. Then, the processor 730 provides corresponding visual output on the display panel 761 based on the touch event type. In FIG. 7, the touch panel 751 and the display panel 751 act as two independent components to implement input and output functions of the mobile phone 700. However, in some embodiments, the touch panel 751 and the display panel 761 may be integrated to implement the input and output functions of the mobile phone 700.

The mobile phone 700 may further include at least one sensor 770, such as a light sensor, a motion sensor, and another sensor. Specifically, the light sensor may include an ambient light sensor and a proximity sensor. The ambient light sensor may adjust luminance of the display panel 761 based on brightness of ambient light. The proximity sensor may turn off the display panel 761 and/or backlight when the mobile phone 700 moves close to an ear. As a type of motion sensor, an accelerometer sensor may detect a magnitude of acceleration in directions (generally, three axes), may detect a magnitude and direction of gravity when the mobile phone is static, and may be configured to recognize a mobile phone posture application (such as landscape-portrait mode switch, related games, or magnetometer posture calibration), vibration-recognition-related functions (such as a pedometer function or knock), or the like. For another sensor that can be configured in the mobile phone 700, such as a gyroscope, a barometer, a hygrometer, a thermometer, or an infrared sensor, details are not repeated herein.

The audio frequency circuit 780, a loudspeaker 781, and a microphone 782 may provide an audio interface between the user and the mobile phone 700. The audio frequency circuit 780 may transmit, to the loudspeaker 781, an electrical signal that is obtained after conversion of received audio data. The loudspeaker 781 converts the electrical signal into a sound signal and outputs the sound signal. In addition, the microphone 782 converts a collected sound signal into an electrical signal. The audio frequency circuit 780 receives the electrical signal, converts the electrical signal into audio data, and then outputs the audio data to the RF circuit 710, to send the audio data to another mobile phone, or outputs the audio data to the memory 740 for further processing.

WiFi belongs to a short-distance wireless transmission technology. With the WiFi module 790, the mobile phone 700 may help the user receive and send an email, browse a web page, access streaming media, and the like. The WiFi module 790 provides wireless access to the broadband Internet for the user. Though FIG. 7 shows the WiFi module 790, it can be understood that the WiFi module 790 is not a mandatory constituent of the mobile phone 700, and may be totally omitted as required without changing the essence scope of the present invention.

The processor 730 is a control center of the mobile phone 700, is connected to various parts of the entire mobile phone by using various interfaces and lines, and executes various functions of the mobile phone 700 and data processing by running or executing the software program and/or the module stored in the memory 740 and invoking data stored in the memory 740, so as to implement various mobile-phone-based services. Optionally, the processor 730 may include one or more processing units. Preferably, an application processor and a modem processor may be integrated into the processor 730. The application processor mainly processes an operating system, a user interface, an application program, and the like. The modem processor mainly processes radio communication. It can be understood that the modem processor may alternatively not be integrated into the processor 730.

The mobile phone 700 further includes the power supply 720 (such as a battery) that supplies power to all the components. Preferably, the power supply may be logically connected to the processor 730 by using a power supply management system, so that functions such as charging and discharging management and power consumption management are implemented by using the power supply management system.

Although not shown, the mobile phone 700 may further include a Bluetooth module and the like, and details are not repeated herein.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

Methods or steps described in the embodiments disclosed in this specification may be implemented by hardware, a software program executed by a processor, or a combination thereof. The software program may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

This application is described in detail with reference to the accompany drawings and in combination with the exemplary embodiments, but this application is not limited to this. Various equivalent modifications or replacements can be made to the embodiments of this application by a person of ordinary skill in the art without departing from this application shall fall within the scope of this application.

What is claimed is:

1. An imaging method, wherein the imaging method is applied to an imaging apparatus comprising a color camera and a black-and-white camera, wherein resolution of the black-and-white camera is higher than resolution of the color camera, and wherein the imaging method comprises:
    obtaining a zoom magnification;
    simultaneously capturing a color image and a black-and-white image of a target scene, wherein resolution of the black-and-white image is higher than resolution of the color image, and wherein the color image and the black-and-white image have different fields of view of the target scene;
    performing cropping processing on the black-and-white image and the color image separately based on a reciprocal of the zoom magnification to obtain a cropped black-and-white image and a cropped color image having a same field of view, wherein the cropped black-and-white image and the cropped color image having the same field of view of the target scene are obtained by finding overlapping portions of the color image and the black-and-white image having different fields of view of the target scene; and
    merging the cropped color image and the cropped black-and-white image to obtain an output image of the target scene.

2. The imaging method of claim 1, wherein merging the cropped color image and the cropped black-and-white image to obtain the output image of the target scene comprises:
    separating the cropped color image into a chroma component image and a luminance component image; and
    merging the chroma component image and the cropped black-and-white image to obtain the output image.

3. The imaging method of claim 1, wherein merging the cropped color image and the cropped black-and-white image to obtain the output image of the target scene comprises:
    separating the cropped color image into a chroma component image and a luminance component image;
    replacing high frequency information of the luminance component image with high frequency information of the cropped black-and-white image to obtain an optical variable luminance component image; and
    merging the chroma component image and the optical variable luminance component image to obtain the output image.

4. The imaging method of claim 1, wherein before simultaneously capturing the color image and the black-and-white image of the target scene, the imaging method further comprises determining, based on luminance of the target scene, a quantity of image frames captured by the color camera and a quantity of image frames captured by the black-and-white camera.

5. The imaging method of claim 3, wherein merging the cropped color image and the cropped black-and-white image to obtain the output image of the target scene comprises performing one or more of:
    super-resolution processing on the chroma component image;
    super-resolution processing on the luminance component image; or
    super-resolution processing on the cropped black-and-white image.

6. The imaging method of claim 5, wherein when determining that there are N image frames captured by the black-and-white camera, performing super-resolution processing on the cropped black-and-white image comprises:
    performing super-resolution processing using N1 black-and-white image frames in the N image frames when the target scene is a high luminance scene; or
    performing super-resolution processing using N2 black-and-white image frames in the N image frames when the target scene is not a high luminance scene, wherein each of N, N1, and N2 is a positive integer, and wherein N1<N2<N.

7. The imaging method of claim 1, wherein before capturing the color image of the target scene, the imaging method further comprises adjusting an imaging parameter of the output image based on luminance of the target scene, wherein the imaging parameter comprises at least one of the following parameters: a noise reduction parameter, a sharpening parameter, or a contrast.

8. An imaging apparatus, comprising:
    a color camera configured to capture a color image of a target scene;
    a black-and-white camera configured to capture a black-and-white image of the target scene at the same time the color image is captured, wherein resolution of the black-and-white image is higher than resolution of the color image, and wherein the color image and the black-and-white image have different fields of view of the target scene; and
    a processor coupled to the color camera and the black-and-white camera, wherein the processor is configured to:
        obtain a zoom magnification;
        perform cropping processing on the black-and-white image and the color image separately based on a reciprocal of the zoom magnification to obtain a cropped black-and-white image and a cropped color image having a same field of view, wherein the cropped black-and-white image and the cropped color image having the same field of view of the target scene are obtained by finding overlapping portions of the color image and the black-and-white image having different fields of view of the target scene; and
        merge the cropped color image and the cropped black-and-white image to obtain an output image of the target scene.

9. The imaging apparatus of claim 8, wherein the processor is further configured to:
    separate the cropped color image into a chroma component image and a luminance component image; and
    merge the chroma component image and the cropped black-and-white image to obtain the output image.

10. The imaging apparatus of claim 8, wherein the processor is further configured to:
 separate the cropped color image into a chroma component image and a luminance component image;
 replace high frequency information of the luminance component image with high frequency information of the cropped black-and-white image to obtain an optical variable luminance component image; and
 merge the chroma component image and the optical variable luminance component image to obtain the output image.

11. The imaging apparatus of claim 8, wherein the processor is configured to determine, based on luminance of the target scene, a quantity of image frames captured by the color camera and a quantity of image frames captured by the black-and-white camera.

12. The imaging apparatus of claim 10, wherein the processor is further configured to perform one or more of:
 super-resolution processing on the chroma component image;
 super-resolution processing on the luminance component image; or
 super-resolution processing on the cropped black-and-white image.

13. The imaging apparatus of claim 12, wherein when the cropped black-and-white image has N image frames, the processor is further configured to:
 perform super-resolution processing using N1 black-and-white image frames in the N image frames when the target scene is a high luminance scene; and
 perform super-resolution processing using N2 black-and-white image frames in the N image frames when the target scene is not a high luminance scene, wherein each of N, N1, and N2 is a positive integer, and wherein N1<N2≤N.

14. The imaging apparatus of claim 8, wherein the imaging apparatus is further configured to adjust an imaging parameter of the output image based on luminance of the target scene, and wherein the imaging parameter comprises at least one of the following parameters: a noise reduction parameter, a sharpening parameter, or a contrast.

15. The imaging apparatus of claim 8, wherein at least one of the color camera or the black-and-white camera comprises an optical image stabilization module.

16. An optical imaging apparatus, comprising:
 a color camera configured to capture a dynamic or static color image of a target scene;
 a black-and-white camera configured to capture a dynamic or static black-and-white image of the target scene at the same time the color image is captured, wherein resolution of the black-and-white image is higher than resolution of the color image, and wherein the color image and the black-and-white image have different fields of view of the target scene;
 a memory configured to store the color image captured by the color camera and the black-and-white image captured by the black-and-white camera;
 a processor coupled to the memory, the color camera, and the black-and-white camera, wherein the processor is configured to:
  obtain a zoom magnification;
  perform cropping processing on the black-and-white image and the color image separately based on a reciprocal of the zoom magnification to obtain a cropped black-and-white image and a cropped color image having a same field of view, wherein the cropped black-and-white image and the cropped color image having the same field of view of the target scene are obtained by finding overlapping portions of the color image and the black-and-white image having different fields of view of the target scene; and
  merge the cropped color image and the cropped black-and-white image to obtain an output image of the target scene; and
 a screen coupled to the processor and configured to display the output image.

17. The optical imaging apparatus of claim 16, wherein the processor is configured to determine, based on luminance of the target scene, a quantity of image frames captured by the color camera and a quantity of image frames captured by the black-and-white camera.

18. The optical imaging apparatus of claim 16, wherein the processor is further configured to:
 separate the cropped color image into a chroma component image and a luminance component image;
 replace high frequency information of the luminance component image with high frequency information of the cropped black-and-white image to obtain an optical variable luminance component image; and
 merge the chroma component image and the optical variable luminance component image to obtain the output image.

19. The optical imaging apparatus of claim 18, wherein the processor is further configured to perform one or more of:
 super-resolution processing on the chroma component image;
 super-resolution processing on the luminance component image; or
 super-resolution processing on the cropped black-and-white image.

20. The optical imaging apparatus of claim 19, wherein when the cropped black-and-white image has N image frames, the processor is further configured to:
 perform super-resolution processing using N1 black-and-white image frames in the N image frames when the target scene is a high luminance scene; and
 perform super-resolution processing using N2 black-and-white image frames in the N image frames when the target scene is not a high luminance scene, wherein each of N, N1, and N2 is a positive integer, and wherein N1<N2≤N.

* * * * *

UNITED STATES PATENT AND TRADEMARK OFFICE
CERTIFICATE OF CORRECTION

PATENT NO. : 10,810,720 B2
APPLICATION NO. : 16/347146
DATED : October 20, 2020
INVENTOR(S) : Gang Chen, Zhongwei Tang and Wei Luo Page 1 of 1

It is certified that error appears in the above-identified patent and that said Letters Patent is hereby corrected as shown below:

In the Claims

Claim 6, Column 18, Line 26: "N1<N2<N." should read "N1<N2≤N."

Signed and Sealed this
Twenty-fourth Day of November, 2020

Andrei Iancu
*Director of the United States Patent and Trademark Office*